US006943992B2

(12) United States Patent
Lin

(10) Patent No.: US 6,943,992 B2
(45) Date of Patent: Sep. 13, 2005

(54) INVERTED WRITE HEAD FOR VERTICAL RECORDING

(75) Inventor: Charles Lin, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 570 days.

(21) Appl. No.: 09/942,290

(22) Filed: Aug. 30, 2001

(65) Prior Publication Data

US 2003/0043513 A1 Mar. 6, 2003

(51) Int. Cl.[7] .................................................. G11B 5/39
(52) U.S. Cl. ....................................................... 360/317
(58) Field of Search ................................ 360/317, 126, 360/125

(56) References Cited

U.S. PATENT DOCUMENTS

| 4,546,398 A | 10/1985 | Toda et al. ................. 360/126 |
| 4,652,956 A | 3/1987 | Schewe ...................... 360/123 |
| 4,703,382 A | 10/1987 | Schewe et al. ............. 360/125 |
| 4,974,110 A | 11/1990 | Kanamine et al. .......... 360/126 |
| 5,719,730 A | 2/1998 | Chang et al. |
| 6,038,106 A | 3/2000 | Aboaf et al. |
| 6,513,228 B1 * | 2/2003 | Khizroev et al. ........ 29/603.14 |
| 2001/0022712 A1 * | 9/2001 | Funayama et al. .......... 360/317 |
| 2002/0034043 A1 * | 3/2002 | Okada et al. ................ 360/125 |
| 2002/0036871 A1 * | 3/2002 | Yano et el. .................. 360/317 |
| 2002/0171975 A1 * | 11/2002 | Plumer et al. .............. 360/125 |
| 2002/0176214 A1 * | 11/2002 | Fhukh et al. ............... 360/317 |
| 2004/0061973 A1 * | 4/2004 | Crue et al. .................. 360/126 |

* cited by examiner

Primary Examiner—Angel Castro
(74) Attorney, Agent, or Firm—George O. Saile; Stephen B. Ackerman

(57) ABSTRACT

An improved read-write head for use with magnetic disks is described. This improvement has been achieved by providing the read head with shields that are limited to performing only shielding and do not share other magnetic functions with parts of the write head. This allows the write pole to be located very close to the read head since the top shield is no longer required to provide a flux return path, this function now being provided by a separate return flux pole. The separation between the read and write heads is now limited only by the need to achieve an optimum vertical field profile. Two key advantages of this structure are a substantial reduction in the jagging distance of the system and a reduced interference field from the write flux.

18 Claims, 2 Drawing Sheets

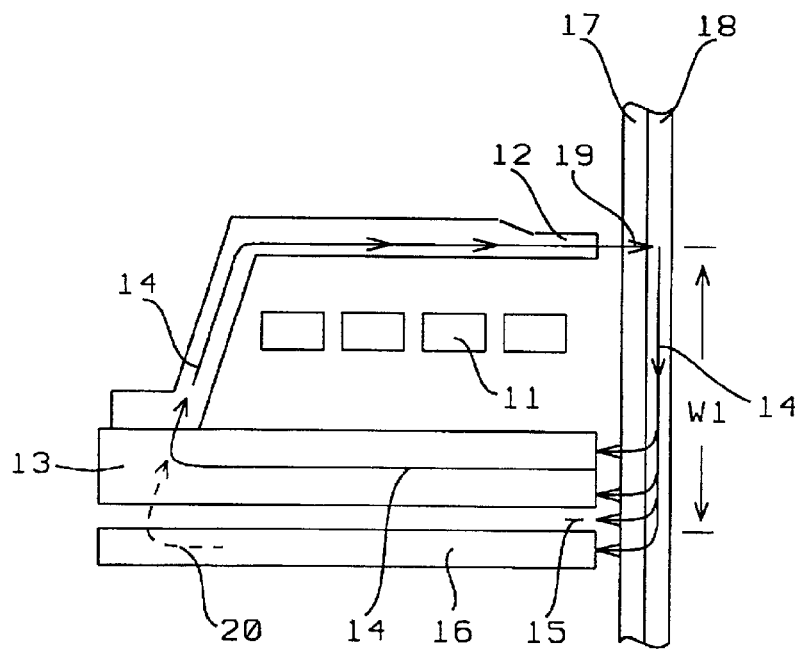
FIG. 1 – Prior Art
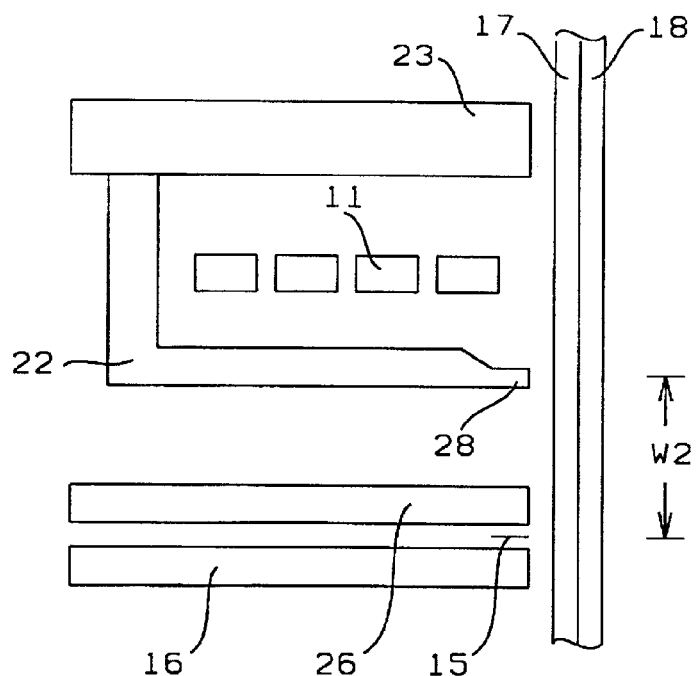
FIG. 2

INVERTED WRITE HEAD FOR VERTICAL RECORDING

FIELD OF THE INVENTION

The invention relates to the general field of magnetic recording with particular reference to very high density recording on magnetic disks.

BACKGROUND OF THE INVENTION

Vertical recording has long been considered for use in ultra-high density storage applications. 200 G bits per square inch is considered feasible for such a design. In its application, the transducer consists of a reader such as a spin valve (SV), magnetic tunneling junction (MTJ) and current perpendicular to plane (CPP), giant magneto-resistance (GMR) device, and a writer, typically a single pole construction, as illustrated in FIG. 1. Write coil 11 is encapsulated between upper write pole 12 and shared pole 13, with the latter providing a flux return path for the write flux 14. As can be seen, the magnetic flux in region 19 is perpendicular to recording layer 17 with the magnetic circuit being completed inside keeper layer 18.

The read portion of the device consists of the read head 15 itself and lower read head shield 16, with shared pole 13 serving as the upper read head shield. The practice of sharing the lower flux return layer with the upper head shield is a legacy of earlier longitudinal recording technology where the write field is generated across a gap between the two poles of the recording assembly. This had the advantage of reducing the separation between writing and recording heads and, additionally, saved one layer.

Although the advantage of saving one layer continues to be part of the prior art design that is illustrated in FIG. 1, there are two disadvantages associated with it. The separation W1 between the write and read heads has been increased and, because of the close proximity of the two head shields, 13 and 16, a certain amount of return flux 20 will flow back through lower shield 16, exposing the read head 15 to a less than optimum environment. The read head 15 will sense some write flux which will interfere with the normal servo signal to produce a spurious position error signal.

The distance between read and write elements needs to be large enough to allow room for the writing coil 11 (including two layers of insulation) and also to give a good vertical write field profile. This requirement calls for a read-to-write distance in the order of 10 μm. When this is combined with a swing arm actuator, the read-to-write track off-set can be rather large. For a track density of 160 ktpi and total ID-to-OD (inside to outside diameter) swing of 20 degrees, the off-set will be about 1.7 μm, or about 10 tracks. Although micro jag can be utilized to cope with this offset, the system performance will be greatly degraded. It is, therefore, imperative to reduce this distance, while maintaining a good vertical write field profile Note that the term 'jag' refers to micro-stepping of the head and the jagging distance is the departure from their aligned positions of the read and write heads.

A routine search of the prior art was performed with the following references of interest being found:

In U.S. Pat. No. 6,038,106, Aboaf et al. show a write head that does not use a shared pole as do Schewe et al. in U.S. Pat. Nos. 4,703,382 4,974,110 (Kanamine et al.), U.S. Pat. No. 4,546,398 (Toda et al.), U.S. Pat. No. 4,652,956 (Schewe) and U.S. Pat. No. 5,719,730 (Chang et al.) are related MR head patents.

SUMMARY OF THE INVENTION

It has been an object of the present invention to provide an improved read-write head for use with magnetic disks.

Another object has been that the separation between the read and write heads in said improved read-write head be less than what is currently available in the prior art.

A further object has been that said improved read-write head have a reduced jagging distance relative to devices of the prior art.

Yet another object has been that said improved read-write head have increased immunity to interference from the write flux.

A still further object has been that, while still meeting the above objectives, said improved read-write head has a good vertical write field profile.

These objects have been achieved by providing the read head with shields that are limited to performing only shielding and do not share other magnetic functions with parts of the write head. This allows the write pole to be located very close to the read head since the top shield is no longer required to provide a flux return path, this function now being provided by a separate return flux pole. The separation between the read and write heads is now limited only by the need to achieve an optimum vertical field profile. Two key advantages of this structure are a substantial reduction in the jagging distance of the system and a reduced interference field from the write flux.

BRIEF DESCRIPTION OF THE DRAWINGS

FIG. 1 shows a read-write head of the prior art.

FIG. 2 shows a read-write head made according to the teachings of the present invention.

DESCRIPTION OF THE PREFERRED EMBODIMENTS

Figure 3:
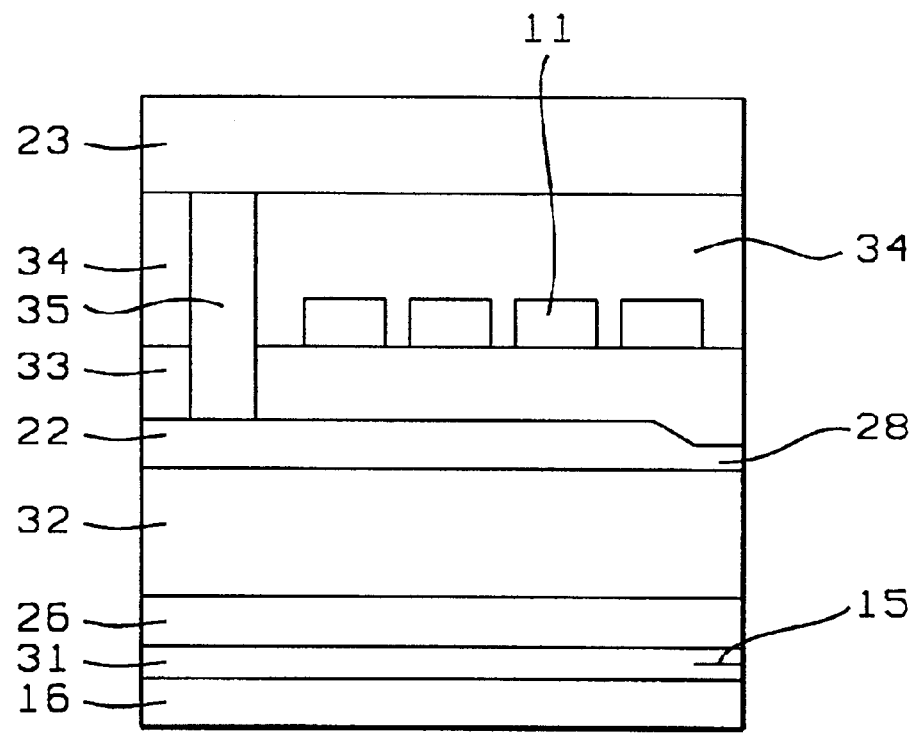
FIG. 3 is a more detailed view of the read-write head shown in FIG. 2.

Referring now to FIG. 2, we show there the magnetic read-write structure of the present invention. The key difference between the present invention and the prior art is that the flux return pole of the write-head has been moved to the top and is no longer shared with the upper read-head shield. General features of the structure include read head 15 which lies between two magnetic shields 16 and 26, the latter being dedicated to serving as a shield and not being shared by any other part of the structure.

The write head for perpendicular magnetic recording includes write pole 22 and a flux return pole 23. Because 2 and 23 form a complete flux closure through disk keeper layer 18, no magnetic flux due to the writing operation can escape and pass through the read head shields 16 and 26. This design allows the read-to-write head separation W2 to be kept to less than about 4 microns. The distance W2 is limited by the need to maintain a good vertical write field profile at tip 28 of write pole 22 (typically between about 3.5 and 6 microns), but, even making allowance for this, it is readily seen that W2 will always be considerably less than W1. The net result is a reduction in the jagging distance that is between about 0.6 and 1 microns, which results in improved system performance.

The present invention places no restrictions on the type of read-head that may be used. Thus the read head could be, for example, of type, SV, MTJ, or CPP, GMR.

In FIG. 3 we show a more detailed view of the structure of the present invention, including the various layers of which it is made. At the bottom is read head 15 which is encapsulated in insulating medium 31 which is sandwiched between magnetic shields 16 and 26. The read head is optimized for reading perpendicularly recorded data in a magnetic medium (such as layer 17 of FIG. 2). These shielding layers are made of a suitable magnetic material such as NiFe, CuZrHf, or Sendust.

Insulating, or spacer, layer 32 (thickness between about 1.5 and 4 microns) lies on upper shielding layer 26 and, in turn, is covered by magnetic layer 22 (thickness between about 1 and 3 microns and made of a suitable magnetic material such as NiFe, CoNiFe, CoFeB, CoNiV, and CoNiMo that has been selectively thinned at one end to form perpendicular writing head 28. Second spacer layer 33 (thickness between about 0.5 and 3 microns) covers magnetic layer 22 (thickness between about 1 and 3 microns and made of a suitable magnetic material such as NiFe, CoNiFe, CoFeB, CoNiV, and CoNiMo and serves as the substrate for magnetic coil 11.

A third spacer layer 34 (thickness between about 0.5 and 3 microns) covers the coil and presents a planarized top surface onto which magnetic layer 23 has been deposited. Layer 23 has a thickness between about 1 and 5 microns and is made of a suitable magnetic material such as NiFe, CoNiFe, CoFeB, CoNiV, and CoNiMo.

Flux connection between layers 22 and 23 is provided by a cavity that extends between them (passing through layers 33 and 34), said cavity being filled with magnetic material 35 (made of a suitable magnetic material such as NiFe, CoNiFe, CoFeB, CoNiV, and CoNiMo. Sections 23 and 35 may also be plated simultaneously during the same step.

What is claimed is:

1. A read-write head for a magnetic disk, comprising:
   a read head between two magnetic shields;
   a write head for perpendicular magnetic recording including a write pole and a flux return pole; and
   said write pole providing, together with said flux return pole, complete flux closure, whereby magnetic flux returned to the write pole does not flow through either of said magnetic shields and said read-write head has a jagging distance that is between about 0.6 and 1 microns.

2. The read-write head described in claim 1 wherein the write pole is between about 3.5 and 6 microns from said read head.

3. The read-write head described in claim 1 wherein the write pole and the flux return pole are separated by a distance that is large enough to allow an optimum vertical field profile.

4. The read-write head described in claim 1 wherein the write pole is between about 3.5 and 7 microns from the flux return pole.

5. The read-write head described in claim 1 wherein said read head is a SV GMR type read head.

6. The read-write head described in claim 1 wherein said read head is a MTJ GMR type read head.

7. The read-write head described in claim 1 wherein said read head is a CPP GMR type read head.

8. The read-write head described in claim 1 wherein a write coil is located between the write pole and the flux return pole.

9. A read-write head for a magnetic disk, comprising:
   a read head, having inner and outer edges, optimized for reading perpendicularly recorded data in a magnetic medium;
   the read head disposed to lie between upper and lower shielding layers, each shielding layer having an edge that is coplanar with said read head outer edge;
   a first spacer layer on said upper shielding layer;
   on said first spacer layer a first magnetic layer, having an outer edge, that functions as a write pole for perpendicular magnetic recording;
   on said first magnetic layer, a second spacer layer;
   on said second spacer layer, a thin film coil;
   on the second spacer layer and the thin film coil, a third spacer layer;
   on the third spacer layer a second magnetic layer having an outer edge;
   said outer edges of the read head, the first magnetic layer, and the second magnetic layer all lying in a single plane;
   a cavity that extends from the first magnetic layer, through the second and third spacer layers, to the second magnetic layer;
   the cavity being disposed so that said thin film coil lies between the cavity and said single plane; and
   said cavity being filled with a third magnetic layer that contacts both the first and second magnetic layers, whereby said second magnetic layer functions as a flux return pole for said first magnetic layer.

10. The read-write head described in claim 9 wherein the shielding layers are selected from the group consisting of NiFe and CoZrHf.

11. The read-write head described in claim 9 wherein the first spacer layer has a thickness between about 1.5 and 4 microns.

12. The read-write head described in claim 9 wherein the first magnetic layer has a thickness between about 1 and 3 microns.

13. The read-write head described in claim 9 wherein the second spacer layer has a thickness between about 0.5 and 3 microns.

14. The read-write head described in claim 9 wherein the third spacer layer has a thickness between about 0.5 and 3 microns.

15. The read-write head described in claim 9 wherein the second magnetic layer has a thickness between about 1 and 3 microns.

16. The read-write head described in claim 9 wherein the first magnetic layer is selected from the group consisting of NiFe, CoNiFe, CoFeB, CoNiV, and CoNiMo.

17. The read-write head described in claim 9 wherein the second magnetic layer is selected from the group consisting of NiFe, CoNiFe, CoFeB, CoNiV, and CoNiMo.

18. The read-write head described in claim 9 wherein the third magnetic layer is selected from the group consisting of NiFe, CoNiFe, CoFeB, CoNiV, and CoNiMo.

* * * * *